United States Patent [19]

Martin, Jr. et al.

[11] Patent Number: 4,522,578

[45] Date of Patent: Jun. 11, 1985

[54] APPARATUS FOR INTRODUCING A FOAMABLE PLASTIC INSULATION INTO THE SPACE DEFINED BY AN INNER CORE PIPE AND AN OUTER CASING PIPE WHILE MAINTAINING THE SPACING OF THE PIPES

[75] Inventors: William W. Martin, Jr., Denver; David W. French, Littleton, both of Colo.

[73] Assignee: J-M Manufacturing Co., Inc., Stockton, Calif.

[21] Appl. No.: 214,154

[22] Filed: Dec. 8, 1980

[51] Int. Cl.³ .............................. B29D 27/04
[52] U.S. Cl. .................... 425/110; 249/91; 264/46.5; 264/46.7; 264/46.9; 425/123; 425/256; 425/817 R; 425/DIG. 29
[58] Field of Search .............. 264/46.9, 46.5, 46.7; 425/110, 123, 256, 817 R, DIG. 29; 249/91

[56] References Cited

U.S. PATENT DOCUMENTS

| | | | |
|---|---|---|---|
| 3,090,078 | 5/1963 | Ackles | 264/46.5 |
| 3,311,948 | 4/1967 | Akelsonn | 264/46.5 X |
| 3,439,075 | 4/1969 | Bauer et al. | 264/46.9 X |
| 3,444,279 | 5/1969 | Dost | 264/46.5 |
| 3,491,171 | 1/1970 | French | 264/46.5 |
| 3,876,145 | 4/1975 | Gusmer et al. | |
| 3,950,461 | 4/1976 | Levens | 264/46.5 |
| 4,051,209 | 9/1977 | Tabler | 264/46.5 X |
| 4,073,841 | 2/1978 | Dültgen et al. | 264/46.9 X |
| 4,138,454 | 2/1979 | Harmon et al. | 264/46.5 X |

FOREIGN PATENT DOCUMENTS

| | | | |
|---|---|---|---|
| 2010926 | 9/1971 | Fed. Rep. of Germany | 264/46.7 |
| 54-10584 | 5/1979 | Japan | 264/46.5 |
| 1220349 | 1/1971 | United Kingdom | 264/46.9 |

OTHER PUBLICATIONS

"The Encyclopedia of Patent Practice and Invention Management," Robert Calvert, Edt., New York, Reinhold, ©1964, p. 138.

Primary Examiner—Philip Anderson

[57] ABSTRACT

This invention relates to insulated pipe and methods and apparatus for making the same. There has been difficulty in placing foamable insulating materials in the narrow elongated space between a casing pipe and a core pipe. According to the instant invention, a miniaturized mix head is inserted in this elongated space. Constituents of the foamable insulating material are simultaneously mixed and disseminated by the mix head in a manner to create a moving foam front which displaces air within the elongated space and permits the formation of a layer uniform, low density insulating material therein.

1 Claim, 5 Drawing Figures

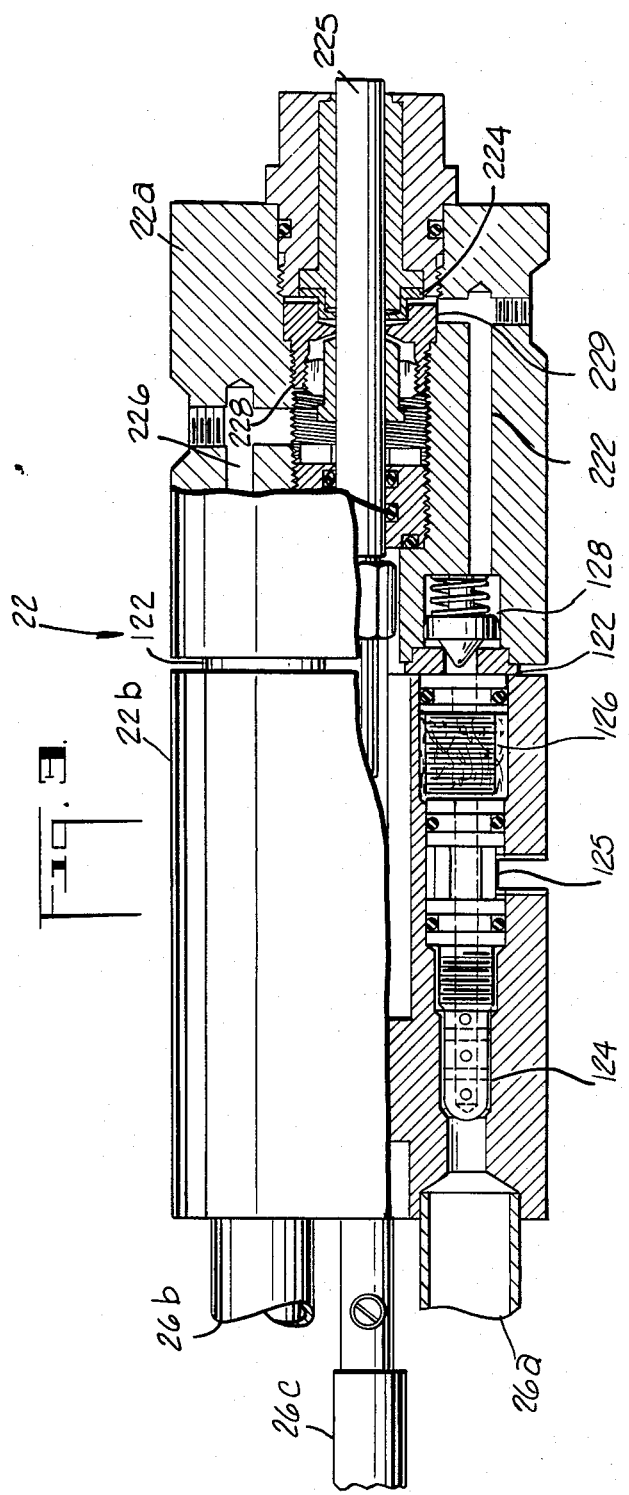

APPARATUS FOR INTRODUCING A FOAMABLE PLASTIC INSULATION INTO THE SPACE DEFINED BY AN INNER CORE PIPE AND AN OUTER CASING PIPE WHILE MAINTAINING THE SPACING OF THE PIPES

TECHNICAL FIELD

This invention relates to the manufacture of insulated members and particularly to a method and apparatus for insulating the generally annular space between a core pipe and a casing pipe as an operation in the manufacture of insulated fluid conduits. While the principles of the invention will be explained in relation to the construction of such conduit, it will be understood that these principles are applicable to the insulating of other hollow articles. More particularly, this invention relates to the placement of a foamable, curable material, usually an organic polymer, which ultimately results in a low density, rigid, foamed material when cured.

BACKGROUND OF THE PRIOR ART

In the past, an insulated conduit has been made by constructing a pipe section comprising a core pipe, a casing pipe positioned generally coaxially around or at least aligned with the axis of core pipe, and appropriate material between the core pipe and the casing pipe to thermally insulate the core pipe, and means to permit the connection of the pipe section to other similar sections. The insulating material, generally a foamable polyurethane material is placed in the generally annular space between the core pipe and the casing pipe. This placement is done by positioning the core pipe within the casing pipe by the use of end plugs and, if necessary, a rigid spacer in the annular space somewhere approximate the center of the pipe section. The core pipe and casing pipe were angled at approximately 15° to the horizontal. A source of the foamable, curable urethane material was connected to a flexible hose and this hose is introduced into the space. The material, in an activated but un-foamed (liquid) condition was conducted down the hose to the annular space and flowed down the pipe to a point approximate the end of the casing remote from the upper end thereof. As the material reacts, it foams, expands and flows along the axis of the elongated space and up the distance defined by the casing and the core pipe, substantially filling the elongated space. The reacting urethane becomes relatively rigid and encapsulates inumerable small gas bubbles to insulate the core pipe.

Because the pipe section must be of substantial length (up to 10' to 20' or more in total longitudinal dimension) a number of problems arise from this method. Because of the distance that the material must be conducted, various parameters well known in the polymer foaming art must be adjusted to delay the reacting and foaming in order to permit the material to be deposited in the pipe before the material begins to react and foam. This delay prevents the clogging of the hose used to introduce this material and also, prevents the material from foaming up and "blocking" a portion of the space, thus entrapping a portion of air and creating a void in the insulating layer of the cured, foamed material.

While pouring and foaming the insulating material in the manner described above reduces condierably the void creating problems, it often increases material usage. It was found that when an adequate amount of material was placed towards the lower end of the sloping pipe, hydrostatic pressure and slowed reaction time prevented the material from fully expanding to its optimum density during the foaming operation. This hydrostatic pressure was a result of both the fluid "head" created over a portion of the material by the mass of unfoamed/foaming material, as well as the tendency of the material to become highly viscous during its expanding process, thus limiting the degree to which the underlying foaming material could expand due to sheer forces between the viscous material and the pipe wall surfaces.

Attempts to increase the rate of foaming reaction of the insulating material, and thus increase the tendency of the foam to fully expand, resulted in generating compressive forces and high exothermic reaction temperatures on the interior pipe which, if the interior pipe was made of a thermoplastic (specifically PVC), led to undue heating and subsequent collapse of the core pipe. Reducing the angle of the pipe relative to the horizontal would tend to reduce the "head" over the expanding material, and thus reduce the hydrostatic pressure and permit greater expansion. However, this would precipitate entrapping air pockets and result in the creation of cavities in the insulating material and concomitant reduction in the insulating value provided thereby.

BRIEF SUMMARY OF THE INVENTION

Accordingly, the present invention includes apparatus for placing insulating material around a core pipe which is axially aligned and surrounded with a casing pipe. This core pipe and casing pipe thus define an elongated space of generally annular cross section. The method comprises introducing, from a position remote from the space a source of insulating material in a flowable form, disseminating this material from the source into the elongated space adjacent this source. While continuing to disseminate this material, the source is moved relative to said elongated space along the axis thereof whereby to create a moving front of insulating material. Said front moves along the axis and presents a surface facing the direction of movement of this front such that the material accumulates at the surface of this front to substantially fill the elongated space and substantially exclude voids created by pockets of gas entrapped in the space by the insulating material. Preferably, this material comprises a curable foamable insulating material such as polyurethane foam.

Also disclosed is apparatus of placing a layer of foamable settable material between at least a pair of horizontally extending spaced opposed surfaces. These surfaces are closely spaced to one another relative to their horizontal extent. This use of the inventive apparatus comprises introducing, from a position remote from a first portion of these opposed surfaces, a source of the foamable settable material in an unset unfoamed flowable condition. This material is disseminated from the source. With this dissemination, the foaming of this material is initiated whereby said the material expands during the foaming to substantially fill a portion of the space between these opposed surfaces. The source is moved relative to the surfaces during the foaming to create a moving foam front which presents a substantial surface facing the direction of the movement of this source. The distance between the surface of the foam front and the source of material is controlled while disseminating this material such that the material expands behind the foam front to substantially exclude voids created by pockets of air entrapped in the space between the surfaces and the expanding material. Also disclosed is an apparatus for placing a foamable, curable material in a space defined between a core pipe and an axially aligned casing pipe comprising a reservoir remote from this space. This reservoir provides the constituents of the material. This apparatus further comprises means for separately conducting these constituents to the space from the reservoir and means for disseminating this material within said space. This last mentioned means further includes means for intimately mixing the constituents separately conducted thereto substantially simulataneously with the disseminating of the material into the space.

BRIEF DESCRIPTION OF THE DRAWINGS

FIG. 3 is a cross-sectional view of a portion of Applicants' preferred embodiment.

DETAILED DESCRIPTION OF THE INVENTION

Figure 1:
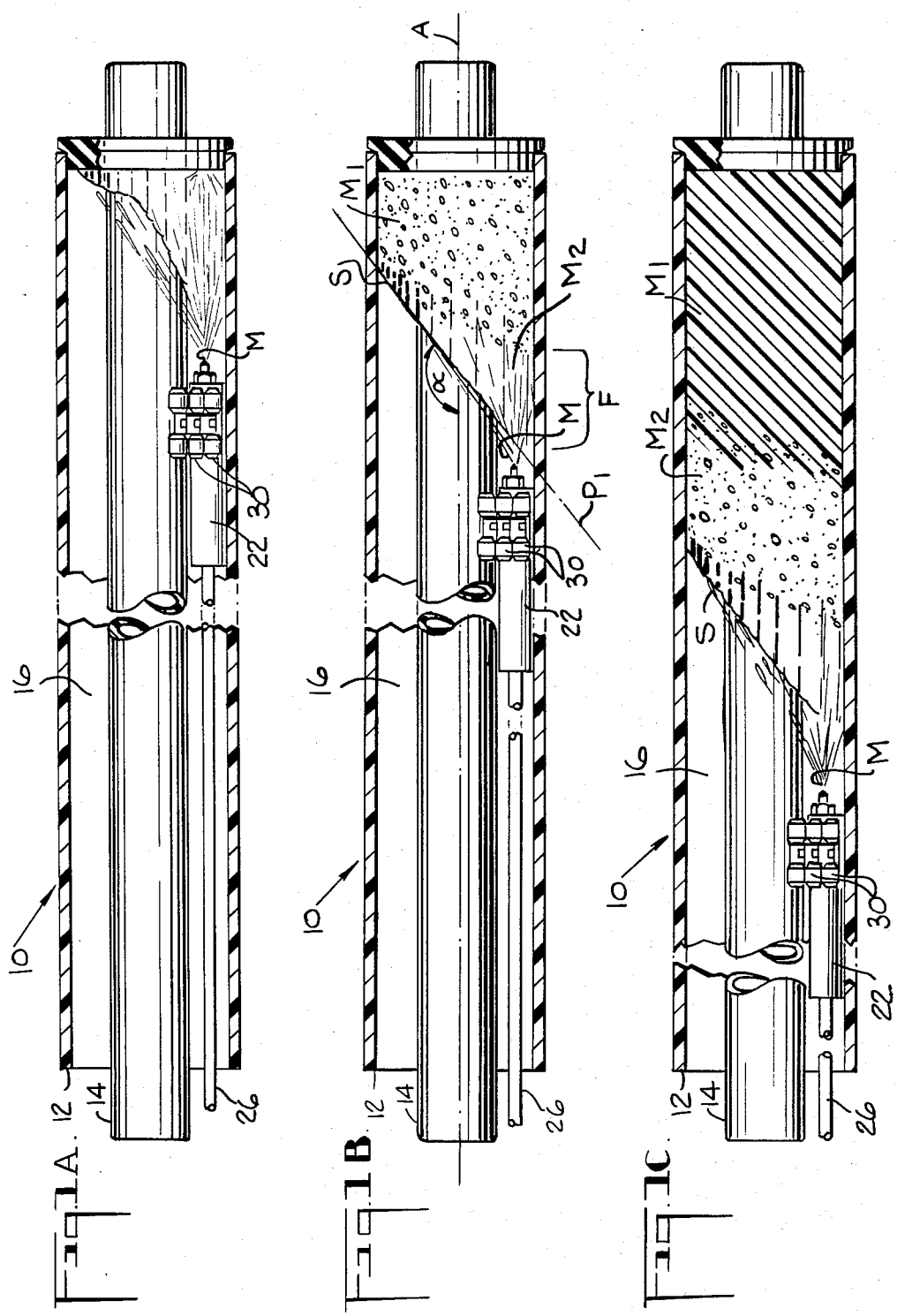
FIGS. 1A, 1B and 1C illustrate the method of placing the insulating material in accordance with Applicants' invention.

Turning to the drawings with particular reference to FIGS. 1A, 1B, and 1C, a typical arrangement for a factory or field insulated conduit is shown by reference numeral 10. Generally, conduit 10, as is typical, comprises a casing pipe 12 which surrounds core pipe 14 (which in the preferred embodiment is a single pipe) which is arranged to extend longitudinally along and aligned with the axis of casing pipe 12. It should be understood, of course, that conduit 10 could comprise one or a number of core pipes surrounded by a single casing pipe 12. In such a system, two or more pipes 14 are aligned with but are spaced in varying relations to the axis of pipe 12. Casing pipe 12 and core pipe 14 thus define between their respective inner and outer surfaces an elongated space 16 of generally annular cross-section. This space extends the full length of insulated conduit 10, except, of course, for end plugs or connecting means associated with the terminal ends thereof. However, a conduit 10 may or may not include such ends plugs in the preferred use of Applicants' inventive concept. An example of such a conduit is shown is in U.S. Pat. No. 3,492,029 assigned to the Assignee of the present application. In this particular conduit, end plugs are indeed provided. In the alternative, tooling may be provided to act as molding surfaces for the subsequently applied insulating layer thus eliminating the need for such end plugs. Means for disseminating insulating material comprising insulating probe 20 is shown in operative position within the to-be-insulated conduit 10. Probe 20 comprises at its distal or remote end a mix head 22 which functions as a source of the insulating material to be placed in the annular space 16.

Connecting mix head 22 with a plurality of feed lines 24 (FIG. 2) is elongated means 26 which connects to actuator 28, which in turn operates mix head 22 as will be further disclosed. Also associated with mix head 22 are centering guides 30.

In operation, insulating probe 20 is moved axially relative to conduit 10, either manually or automatically. This in turn moves mix head 22 generally axially along the longitudinal axis of elongated annular space 16. Conversely, of course, conduit 10 and thus the opposed closely spaced surfaces of 12 and 14 may be moved axially relative to probe 20 in order to bring about the relative movement between mix head 22 and the elongated annular space 16 defined between these surfaces.

FIG. 1b and 1c show this relative movement and the substantially simultaneous dissemination of insulating material M in flowable form from mix head 22.

For reasons that will become apparent, Applicants prefer to use a particular insulating system which employs the use of separate constituents which are mixed together. This mixing initiates the reaction and subsequent foaming and curing of the material. Accordingly, Applicants prefer a known system employing isocyanate and urethane resin components. These materials are mixed intimately by mix head 22 and initiate the foaming reaction to react and form the insulating material.

Figure 2:
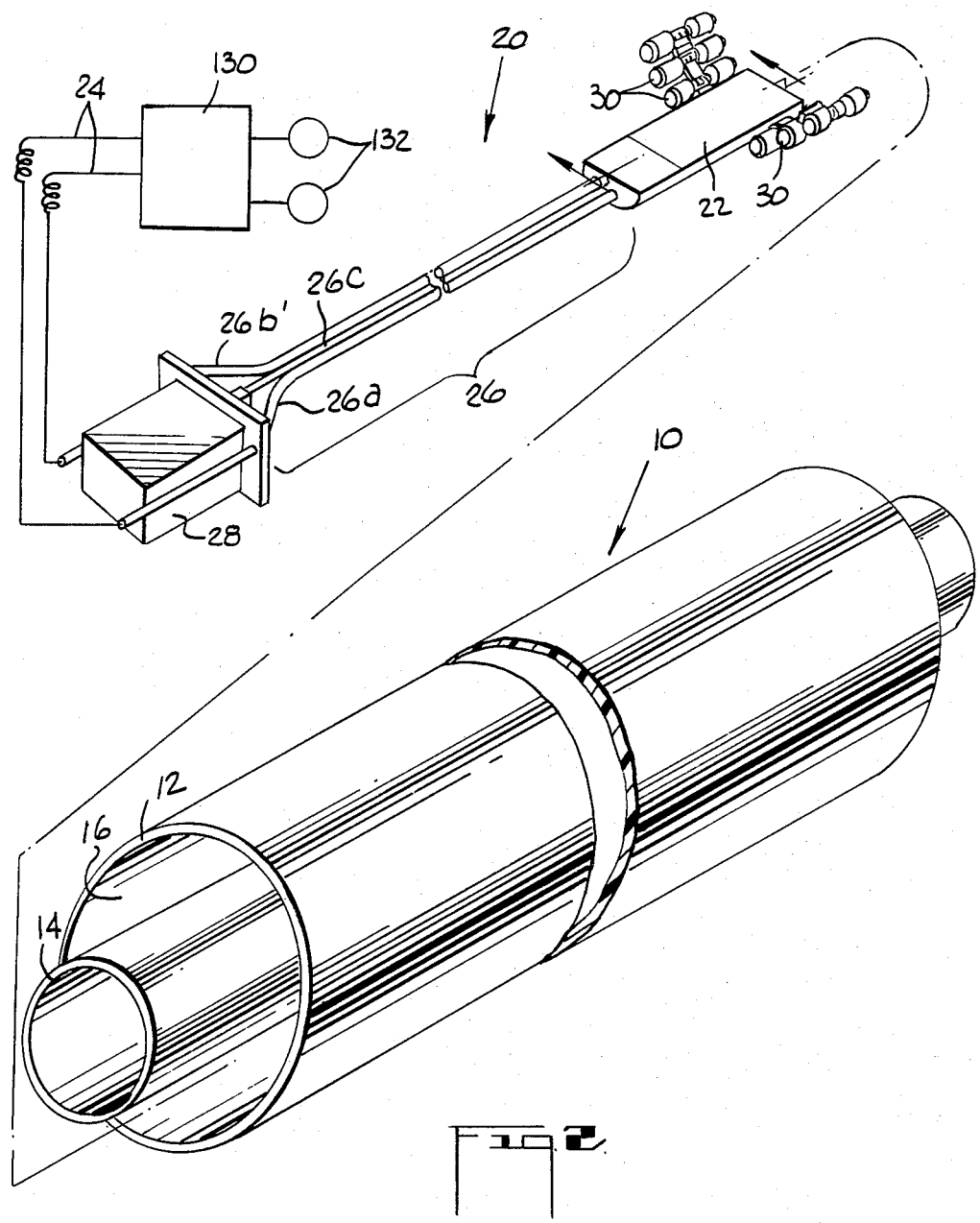
FIG. 2 is a schematic showing of the preferred apparatus for performing the method illustrated in FIG. 1.

The overall insulating material mixing and dispensing system is shown schematically in FIG. 2. Probe 20 is shown attached to flexible high pressure feed lines 24 which in turn are connected to a high pressure dispensing machine 130 and associated resin and isocyanate reservoirs 132. While any number of commercially available dispensing systems would be adaptable to Applicants' invention, Applicants prefer to use the systems disclosed in U.S. Pat. Nos. 3,765,605 and 3,627,275, which patents are hereby incorporated by reference.

The dispensing system disclosed in the above-referenced patents, as well as other similar systems available commercially, dispense precisely metered amounts of active components at relatively high pressures. These components are combined in a manner to intimately intermix these components. This intermixing initiates the curing reaction. The dispensing from high pressure permits gases, either dissolved in one or both of the reactants or which result in a chemical reaction initiated by the mixing, to begin to expand and thus form gas bubbles throughout the liquid or semi-liquid reacting polymer mass.

Because of the unique operation necessitated by Applicants' inventive insulating method, mix head 22 has very small vertical dimension to permit its installation between the opposed, facing surfaces of core pipe 14 and casing pipe 12. This dimensional restriction has led to the separation from the mix head 22 itself from the actuator 28. This physical separation is made possible by the provision of an elongated member 26 which has a longitudinal dimension adequate to place mix head 22 adjacent a first portion of the opposed surfaces which define the remote end of annular space 16 of the longest pipe section which is anticipated to be insulated. The preferred embodiment this dimension is about 20 feet (6 meters). Means 26 includes high pressure conduits 26a and 26b which are preferably constructed of a rigid stainless steel to provide thickness and rigidity necessary to maintain mix head 22 at a fixed distance from the actuator 28. Means 26 further includes valving rod 26c which is moved by actuator 28 a controllable axial distance to displace the end thereof positioned within mix head 22 to controllably and simultaneously mix the components provided via 26a and 26b and disseminate the resulting material. Depending upon the particular chemical system employed, conduits 26a and 26b may include electrical heater tapes in order to condition the chemical constituents passing therethrough and provide these constituents to mix head 22 in optimum condition for mixing, disseminating, foaming and curing thereof to form the insulating material.

FIG. 3 shows a partial cross-section of mix head 22 showing the flow paths of the isocyanate and resin constituents to a valving and impinger assembly associated with the end of valving rod 26c.

While other disseminating and mixing systems may be employed, Applicants prefer the system shown in FIG. 3, the basic principles of which are set forth in further detail in U.S. Pat. No. 3,876,145, which patent is hereby incorporated by reference. Other systems having labyrinth path type of mixing may be employed however. A system of high pressure mixing as shown in U.S. Pat. No. 3,263,928 may also be used as a substitute of the particular arrangement shown in FIG. 3. In general, the mix head 22 shown in FIG. 3 has the characteristics of mixing of the constituents and thus initiating the subsequent foaming and curing of the material disseminated therefrom simultaneously with that dissemination.

Mix head 22 consists of two major components, mix head block 22a and valve block 22b which in the operative condition are fixedly attached to one another via bolt or bolts (not shown) accessible from the rear end of valve block 22b. Sealing gaskets 122 seal the flow paths of the components passing through 26a and 26b to the respective portions of mix head block 22a.

The flow path of each of the components through value block 22b are generally identical, so for simplicity, the flow path of second component only will be outlined in detail. This can be seen in the lower portion of FIG. 3 elongated conduit 26a is attached to the rear portion of valve block 22b. Disconnect valve 124 can be operated by rotation of valve member 125 positioned therein to prevent loss of component from the flow channel defined therein when valve block 22b is disconnected from mix head block 22a. Component passes through filter screen 126 past check valve 128 to component channel 222. It should be noted that component channel 222 is parallel to the axial direction of elongated operating rod 26c. This parallel orientation is consistant with the flow channels passing through valve block 22b and contributes to the overall compact arrangement of mix head 22. From component channel 222 the material passes to component impinger 224.

The flow channels through mix head 22 connected to component conduit 26b is generally identical to that set forth above, except of course that first component channel 226 terminates at first component impinger 228 rather than continuing forward of throat 229. This arrangement also contributes to the overall compact arrangement of mix head 22 and leads the first component contained in this flow channel to the throat 229. The operation of valve rod 225 and its relation to throat 229 and operation thereof is set forth in greater detail in U.S. Pat. No. 3,876,145 mentioned supra.

Thus mix head 22, as the source of the insulating material, is positioned within space 16 and adjacent to the ultimate position of the material disseminated thereby. This close proximity or adjacency permits the employing of a chemical foaming system which has a quicker reaction time (in terms of cream time and foam time, as well as tack free time) than that employed in the prior art insulating system set forth above. The parameters controlling of such a quick reaction time chemical foam system are well known in the art. These parameter include the amount of catalyst addition, constituent selection, blowing agent, and temperature at which the materials are mixed and maintained, all of which contribute to the rate at which the disseminated material begins to foam and rise to substantially its fully foamed condition.

Referring again to FIGS. 1a, 1b and 1c, the operation of the disclosed system will now be set forth. With casing pipe 12 and core pipe 14 axially aligned and substantially horizontally oriented as shown, probe 20 is moved relative thereto to bring mixing head 22 approximate to the remote end of space 16. In the preferred embodiment, mix head 22 has a vertical dimension is equal to or less than the distance between the inner wall of casing pipe 12 and outer wall of core pipe 14. In this manner, the mixing head can itself provides a local support for core pipe 14 and thus comprises means for at least partially maintaining the surfaces of pipes 12 and 14 in controlled relationship with one another. To this end, Applicants prefer to install mixing head 22 below core pipe 14 in order to counteract the tendency of gravity to cause core pipe 14 to sag. It should be understood, of course, that some means other than mix head 22 may be employed to be associated with mix head 22 to support the pipe if it is found desirable to disseminate the material from a position other than below core pipe 14.

In order to aid mix head 22 in this support function, support guides 30 are pivotally attached thereto. These are positioned in cavity 16 and in contact with the outer surface of core pipe 14 and/or the inner surface of casing pipe 12 at positions lateral to mix head 22. Thus rollers 30 and mix head 22 form an adjustable U-shaped support means which conformably wraps around at least the lower-portion of pipe 14.

The dissemination, and thus the initiation of the foaming and curing reaction is performed from the position shown in FIG. 1a. In practice, the initial distance between the end of space 16 (defined by either an end plug or a mold surface of appropriate tooling) and the discharge tip of mix head 22 has been found to be between 2 feet and 4 feet. The material M in liquid form sprays onto the end plug or mold surface (not shown) and the facing surfaces of core pipe 14 and casing pipe 12. After an adequate amount of material M has been disseminated the probe 20, mix head 22 begins a controlled withdrawal from space 16 while continuing to disseminate material M. The first portion of material M begins to react and the gas material disposed or created therein begins to expand to form a mass of rising foam $M_1$. While a majority of the material in the preferred embodiment is placed in the lower quadrant of the annular cross-section of 16, the material in the liquid or semi-liquid state during this initial rise envelopes core pipe 14 around the entire circumference thereof. This initial rise is substantially unimpeded since additional material placed in front of $M_1$ has yet to substantially react and is thus not in a condition to block the free expansion of the gas bubbles. Also, in contrast with the above-disclosed prior art method, the hydrostatic "head" on material M, in any stage of foaming can be no more than the diameter of the inside surface of casing pipe 12 which, when compared to the longitudinal length of cavity 16, is minimal. This illustrates one of the many advantages of placing material M along a substantially horizontal axis as is being described.

FIG. 1b shows liquid material $M_2$ which has been subsequently placed in the lower quadrant of space 16 and initially placed material $M_1$ having foamed substantially completely around core pipe 14. From this point on the reacting and foaming material $M_1$ creates a foam front which, because of the continuing reaction and foaming of the material $M_1$ as well as the continuing placement of further material $M_2$ in liquid form thereon, moves at a controllable rate along the axis of conduit 10. This foam front F is defined in part by a surface or interface between the placed material and the air in cavity 16 which the foaming and fully foamed material $M_1$ is progressively displacing. Because of this continual placement and renewal of material in liquid form onto and about that foam front, surface S thereof faces the direction of movement of the foam front F along the axis of conduit 10. It should be understood that this surface S is usually something other than a flat surface which faces directly along the axis of conduit 10. On the contrary, it is likely that this surface is of irregular nature which can be approximated by a plane P, angled to the axis of conduit 10. This angularity is in part due to the placement of the majority of the material in the lower quadrant of space 16 and also due to the tendency of the foaming and reacting material, in its semi-liquid state, to remain in the lower quadrant due to gravity.

FIG. 1b shows surface S and this imaginary plane P, generally parallel to the overall surface S. It has been found desirable to maintain surface S, using the parameters set forth above, such that plane P defined thereby forms an angle "a" to an imaginary horizontal plane containing longitudinal axis A of between about 165° and about 90°. Axis A is not only the axis of pipes 12 and 14, but also the axis of elongated space 16 and hence the direction of movement of both the withdrawing mix head 22 and foam front F.

The creation of foam front F results in considerable benefit. First of all, it substantially prevents the entrapment or inclusion of pockets of air within the volume of reacting material, thus reducing substantially the tendency to create cavities in the final cured insulating layer. Secondly, the foam front F and its maintenance by the dissemination of material M from mix head 22 automatically classifies the material M as to its various stages of foaming and curing. The more fully foamed material pushes ahead of it the less cured, more liquid (thus less fully expanded) material, thus eliminating the tendency of a more fully reacted material to block the expansion of this less fully expanded liquid material which may become trapped therebehind. The creation and maintenance of the foam front F is, because of the relationship of the mix head 22 and surface S, substantially independent of the orientation of and direction of progress of the filling of space 16. The horizontal mode of filling, however, is preferred since this orientation minimizes restricting the foaming and expansion of the material M, and also eliminates the handling problems associated with tilting conduits of very long dimensions.

FIG. 1c shows the operation of probe 20 and shows the portion $M_1$ of the foam material M having reacted and cured to the point where it becomes essentially self-supporting. At this stage the material $M_1$ can contribute to the supporting of core pipe 14 and hence to the maintenance of the space between the opposed surfaces of core pipe 14 and casing pipe 12. In this way, core pipe 14, despite its tendency to sag is held in approximately its previously supported, centered position by the cured portions $M_1$ of material M. This supporting function of material $M_1$ works in conjunction with the vertical support provided by the terminal end of insulating probe 20 (either directly on mix head 22 or associated support means such as guides 30) and works to eliminate the need for providing space 16 with spacers or permanently fixed centering members.

An example of the use of Applicants' disclosed method and apparatus will now be set forth. A conduit 10 having an overall length of about 6 meters is positioned horizontally. A core pipe 14 made of PVC and having an outside diameter of about 6 cm is positioned coaxially with casing pipe 12 of PVC and an internal diameter of 15.5 cm. These two pipes are held immobile relative to one another during the foaming operation. An end plug, in accordance with U.S. Pat. No. 3,492,029 is positioned in the remote end thereof. Insulating probe 20 with mix head 22 having a vertical dimension of about 2.5 cm is introduced beneath core pipe 14 and supports the flexible core pipe 14 slightly vertically above its precise axially centered position. Probe 22 is moved to within about 1.5 meters of the end plug (not shown). Isocyanate and resin of known chemistry and is provided to mix head 22 at 110° F. and 800 PSI. Actuator 28 withdraws valving rod 22S via 26c to intimately intermix the constituents provided via 26a and 26b and thus initiating the curing, foaming and disseminating material M at the rate of about 6.8 $K_g$/min from the mix head 22 into the portion of space 16 adjacent thereto and onto the inner surface of the end plug and opposed surfaces of 12 and 14. After about 10 seconds of this, mix head 22 is withdrawn from space 16 at the rate of 25 cm per second while continuing to disseminate material M at the above rate. Foam front F moves at approximately the same rate towards withdrawing probe and associated mix head 22 and is maintained at approximately 1.25 M from mix head during the withdrawal thereof. Foam front F presents surface S facing the direction of movement of foam front having a defining plane P, at an average angle "a" of about 135° to the horizontal plane cotaining axis A. The probe continues to be withdrawn and continues to disseminate material until approximately 50 cm from the open end of cavity 16. Actuator 28 is operated to move valving rod 22S forward and terminate the dissemination, mixing and initiation of material M. The mixing head 22 is now fully withdrawn and an end plug or appropriate mold surface is forced into the open end of space 16. Material M continues to react, foam and expand to fill completely the space 16. Finally, material M is permitted to fully cure.

The polyurethane foaming system preferred by Applicants is one in which the cream time associated therewith is 0.1 to 0.5 seconds, the rise time is 10 to 15 seconds and the tack free time is 10 to 15 seconds. While considerable variation can take place as to each of these parameters, the above times are a guide in order to permit the full utilization of all the benefits of Applicants' invention. For example, the tack free time could be delayed for various reasons. This parameter is only important if the material making up core pipe 14 is one which requires that the fully foamed material M support a substantial portion of its weight and prevent its sagging due to gravity. If this aspect is not important, then tack free time can be delayed in order to reduce the overall temperature rise caused by the reacting foam chemistry.

While Applicants have described their method and apparatus in terms of a polyurethane foam system, it should be understood that other systems embracing an insulating material having a fluid state could be used. For example, an insulating system comprising essentially dry materials which are made flowable by combining with air (for example, fiber glass blowing wool) could be used. In this case, mix head 22 would disseminate and mix a settable binder and chopped fiber glass which would, as the fiber glass accumulates, create a "front" similar to the above described "foam front" at a rate corresponding to the rate which the mix head 22 is withdrawn from the cavity. Other settable materials such as a syntactic foam comprising a reactable binding material and glass or perlite microspheres may also be employed where structural characteristics of such material are desired. In such case, the "foam front" would move along the longitudinal axis of cavity or space 16 primarily in response to the accretion of the materials as they are sprayed onto the previously deposited material by mix head 22. Hence, in contrast with the above-disclosed polyurethane foaming system, movement of the foam front F would not result from the further expansion of gas bubbles behind the surface presented by foam front F. Again, in such a system, the withdrawal of mix head 22 would be controlled to correspond with the accretion of the materials at the foam front F.

Also, it may be desirable to disseminate the material M from mix head 22 in an intermittent fashion rather than continuously along the longitudinal axis of space 16 as set forth supra. In such case, material M would be disseminated on the walls and foam front. The material M would be permitted to foam to substantially its fully expanded dimension and cure, at least to the extent necessary to partially support core pipe 14. Then mix head 22 would be withdrawn by a calculated distance and a further amount of material M would be disseminated. Thus, conduit 10 would be insulated in a discrete step-wise fashion. This system would have the advantage of maintaining core pipe 14 in a precisely located, fixed position and would be advantageous where the precise centering of core pipe 14 is more vital than a rapid insulation placement and completion of each section of conduit 10.

We claim:

1. An apparatus for placing a foamable, curable material in a space defined between a core pipe and an axially aligned casing pipe comprising a reservoir remote from said space for providing the constituents of said material, means for separately conducting said constituents of said material to said space from said reservoir, and means for disseminating said material within said space; said last mentioned means further including means for intimately mixing said constituents separately conducted thereto substantially simultaneously with said disseminating said material within said space, said means for disseminating further includes means for supporting said core pipe relative to said casing pipe whereby to maintain a fixed relationship between said core pipe and said casing pipe, said means for supporting being pivotally attached to said means for disseminating.

* * * * *